W. H. WILSON.
Plow.
No. 23,636.
Patented Apr. 12, 1859.
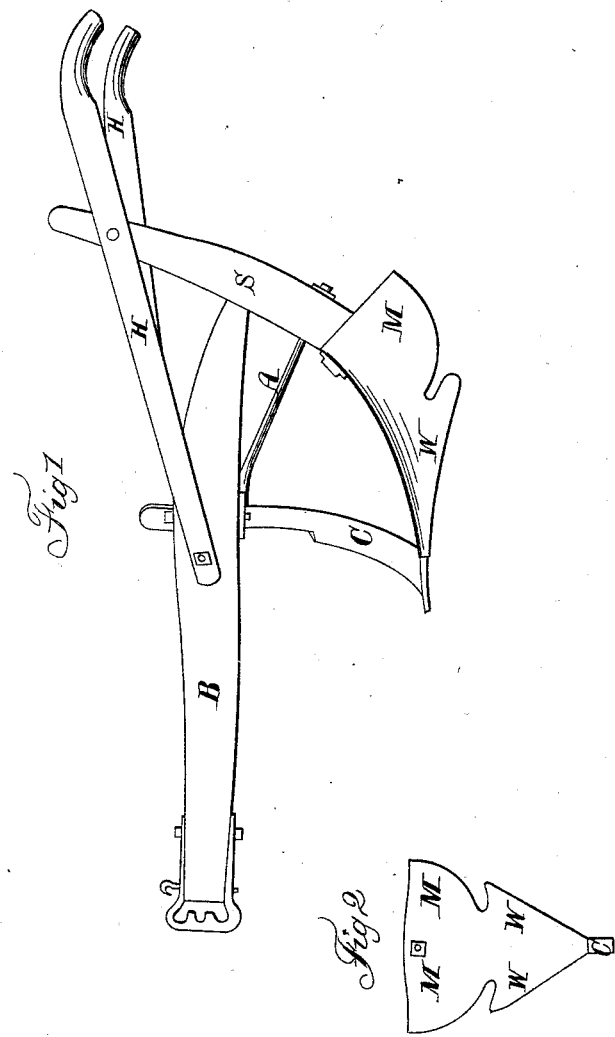

UNITED STATES PATENT OFFICE.

W. H. WILSON, OF SUMMERFIELD, OHIO.

IMPROVEMENT IN PLOWS.

Specification forming part of Letters Patent No. 23,636, dated April 12, 1859.

*To all whom it may concern:*

Be it known that I, WM. H. WILSON, of Summerfield, Noble county, Ohio, have invented a new and useful Improvement in Plows; and I do hereby declare that the following is a full, clear, and exact description of the construction and operation of the same, reference being had to the annexed drawings, making a part of this specification, in which—

Figure 1 is a perspective view of the plow in working order. Fig. 2 is a front view of the subsoil mold-board.

B is a beam four feet four inches long.

H H are the handles, three feet nine inches long.

S is the stem or upright beam, two feet eight inches long, to which the mold-board is bolted.

C is a colter, fourteen inches long or high from base to bottom of the beam.

W W are the subsoil-wings, which run flat on the ground, at the edges ten inches long, but raised in the center.

M M is the mold-board, fourteen inches wide.

A is the brace running from the colter through the stem, with a nut on the end, by which the colter is tightened.

This plow may be regulated by a clevis to run any depth required.

The gradual rise of the wings and shape of the mold-board combined give this plow great advantage over other plows for the same purpose. It lifts the soil and mellows it, leaving the ground in a better condition for the growth of corn and vegetables than the ordinary plow, and with less labor. It may be made of iron, steel, or wood, or a combination of either.

I do not claim the common shovel-plow as now used; but

What I claim, and desire to secure by Letters Patent, is—

The arrangement of the subsoil-shovel W, the common shovel M, colter C, and brace A, the whole being constructed as described, for the purposes set forth.

WM. H. WILSON.

Witnesses:
ROBERT CALLAND,
M. A. WILSON.